(12) United States Patent
Hawkins

(10) Patent No.: US 6,837,123 B2
(45) Date of Patent: Jan. 4, 2005

(54) NON-INVOLUTE GEARS WITH CONFORMAL CONTACT

(76) Inventor: Richard M. Hawkins, P.O. Box 1516, West Point, NY (US) 10997

( * ) Notice: Subject to any disclaimer, the term of this patent is extended or adjusted under 35 U.S.C. 154(b) by 0 days.

(21) Appl. No.: 10/059,389

(22) Filed: Jan. 31, 2002

(65) Prior Publication Data

US 2002/0134184 A1 Sep. 26, 2002

Related U.S. Application Data

(60) Provisional application No. 60/278,198, filed on Mar. 23, 2001.

(51) Int. Cl.$^7$ .............................................. F16H 55/08
(52) U.S. Cl. .......................................... 74/457; 74/462
(58) Field of Search ...................... 74/457, 458, 459.5, 74/460, 462

(56) References Cited

U.S. PATENT DOCUMENTS

| | | | |
|---|---|---|---|
| 1,613,702 A | | 1/1927 | Hammar |
| 1,646,374 A | | 10/1927 | Wilkin |
| 2,335,504 A | | 11/1943 | Gazda |
| 3,206,997 A | * | 9/1965 | Hardy .......................... 74/462 |
| 3,533,300 A | | 10/1970 | Studer |
| 3,855,874 A | * | 12/1974 | Honma et al. ................. 74/462 |
| 4,184,380 A | | 1/1980 | Rivin |
| 4,238,970 A | | 12/1980 | Carter |
| 4,367,058 A | | 1/1983 | Carter |
| 4,492,546 A | * | 1/1985 | Kasuya et al. ........... 418/201.3 |
| 4,640,149 A | | 2/1987 | Drago |
| 4,653,340 A | | 3/1987 | LaBate |
| 4,679,459 A | * | 7/1987 | F'Geppert ..................... 74/460 |
| 4,911,032 A | | 3/1990 | Steele et al. |
| 5,022,280 A | * | 6/1991 | Boiko et al. .................. 74/462 |
| 5,271,289 A | | 12/1993 | Baxter, Jr. |
| 6,178,840 B1 | | 1/2001 | Colbourne et al. |
| 6,205,879 B1 | | 3/2001 | Litvin et al. |

FOREIGN PATENT DOCUMENTS

| | | | |
|---|---|---|---|
| GB | 186436 | 10/1922 | |
| GB | 1232019 | 5/1971 | |
| JP | 53022942 A | * 3/1978 | ........... F16H/55/08 |
| WO | 88/03623 | 5/1988 | |

OTHER PUBLICATIONS

Buckingham, Earle, *Manual of Gear Design*, Section Two (first copyright 1935, by Industrial Press, NY), p. 45.
Buckingham, Earle, *Analytical Mechanics of Gears*, Dover Publications, Inc., New York, 1949, pp. 25–29, 58–73.
Terauchi, Yoshio et al., "On Design and Performance of Involute–Cycloid Composite Tooth Profile Gear," JSME Paper No. 199–17 (Jan. 1982), pp. 118–126.
Hlebanja, Joze, "Influence of the Path of Contact Shape on Sliding Conditions Between Tooth Flanks," JSME International Conference on Motion and PowerTransmissions (Nov. 23–26, 1991), pp. 560–564.
Hlebanja, Joze, "Main Advantages of Non–Involute Spur Gears," AGMA Technical Paper No. 92 FTM 5 (copyright 1992, American Gear Manufacturers Association, Alexandria, VA), pp. 1–6.

* cited by examiner

*Primary Examiner*—David A. Bucci
*Assistant Examiner*—Timothy McAnulty
(74) *Attorney, Agent, or Firm*—Richard C. Litman

(57) ABSTRACT

Several embodiments of various non-involute gear tooth profiles incorporate relief areas formed across the area of the tooth face generally symmetrically to each side of the pitch circle of the gear. The relief area serves to preclude contact across the areas of meshing or mating gear teeth where convex-to-convex contact would otherwise occur, thus precluding high pressure contact between the two gear teeth at the area of the relief. The remainder of the contact of such non-involute gear tooth profiles provides conformal contact, i. e., convex-to-concave mating faces with correspondingly low pressures developed between the tooth portions. The present invention enables a given gear set to absorb considerably greater torque and force than would otherwise be they case, or alternatively allows gear sets to be made considerably smaller and lighter for a given torque transmission, than would otherwise be the case.

15 Claims, 5 Drawing Sheets

NON-INVOLUTE GEARS WITH CONFORMAL CONTACT

CROSS-REFERENCE TO RELATED APPLICATION

This application claims the benefit of U.S. Provisional Patent Application Ser. No. 60/278,198, filed on Mar. 23, 2001.

BACKGROUND OF THE INVENTION

1. Field of the Invention

The present invention relates generally to gear tooth configurations, and more specifically to various gear tooth profiles having a non-involute shape to provide conformal contact between adjacent teeth. The present invention relieves the compressive forces between convex to convex contact of mating gear teeth, by means of a relief formed in one or both of the faces off the mating teeth.

2. Description of the Related Art

Power transmission through gears and/or racks, was first developed hundreds of years ago with simple wooden dowel and socket devices. It was recognized that such relatively crude power transmission systems were not particularly efficient or durable, but it was not until metallurgy and machining was better developed that more efficient gear systems were developed.

It was soon recognized that the specific shape or profile of the teeth of gears, has a considerable bearing upon the accuracy of movement of the gear train, the friction of the gear train, and also the durability of the gears. Various geometric forms have been used for shaping gear teeth, generally based upon the generation of a locus of points along a line being rotated along or generated from the rotation of a circle.

Two basic tooth shapes or profiles have received by far the greatest development: The cycloid, and the involute. The cycloid refers to a curve generated by a point on a circle which is in turn rolled along a straight line. The involute profile is generated by a point on a line which is unrolled from a circle. Both curves are of constant convex shape, with the involute having a constantly increasing radius. Accordingly, these profiles, particularly the, cycloid series, have been modified in the past to provide composite shapes having concave dedenda (the portion below the pitch circle) and convex addenda (above the pitch circle), and/or using a larger hypocycloid to generate a larger base radius for the dedendum of the tooth, relative to a smaller radius for the addendum.

Such a cycloidal (i. e., non-involute) profile possesses a number of advantages over the involute shape, but it was generally not possible to make beneficial use of these advantages until modern times and the development of more sophisticated machining technology. As a result, the involute gear tooth profile has been favored for a long period of time, as (1) it was easier to manufacture; (2) center-to-center distance between shafts is not as critical; and (3) transmission of motion is more uniform with the involute gear profile. Both the cycloid and involute profiles, as well as others, result in relatively high compressive stress concentrations at the area of contact with adjacent teeth where non-conformal (i. e., convex to convex) gear tooth profiles are used, and also in the areas where curvature reverses direction.

However, the cycloid tooth profile does enjoy at least one advantage over the involute profile, in that it is generally a more efficient shape for transmitting force from one gear tooth to an adjacent tooth. Nonetheless, the cycloid profile has not found great favor for the various reasons noted above, even though at least some of those reasons are no longer valid with modern machining technology. While one reason for the lack of acceptance of the cycloid profile may be simple human inertia, in that the involute gear profile has been in widespread use for decades, another reason is the relatively high compressive stress concentration of the cycloid profile at about the pitch circle of the gear.

Accordingly, the present invention provides a means of relieving the relatively high compressive stress which would otherwise occur in the general center of a cycloid (or more generally, non-involute) gear profile where the gears have conformal contact, i. e., generally congruent mating surfaces to provide area contact rather than contact along a relatively narrow line across the face of the tooth. The present invention provides a physical relief formed in the faces and flanks of the gear teeth at the area of each tooth where stresses would otherwise be highest (the face of a gear tooth is the surface of the gear tooth above the pitch circle, while the flank is the surface of the gear tooth below the pitch circle). The use of non-involute gear tooth profiles greatly reduces sliding contact between adjacent gear teeth, while the relief area of the tooth profile serves to eliminate the high compressive forces which would otherwise occur between the convex to convex mating surfaces of such non-involute tooth profiles. Smooth operation is provided by means of helical gear sets which provide tooth profile contact ratios of two or better, in order to avoid rotational discontinuity due to the tooth face relief areas.

A discussion of the related art of which the present inventor is aware, and its differences and distinctions from the present invention, is provided below.

U.S. Pat. No. 1,613,702 issued on Jan. 11, 1927 to Sigard A. S. Hammar, titled "Gear Tooth," describes a tooth profile having a series of steps formed therein. Hammar states that his gear tooth profile provides the strength benefits of the ideal parabolic shape, while also providing tooth profiles between each step which are optimized for relatively high efficiency and low frictional losses. It is noted that the gear tooth profiles illustrated in the drawings of the Hammar '702 U.S. Patent are convex, with the exception of the steps along each tooth. However, Hammar makes no suggestion of any means for relieving the relatively high compressive loads which occur between mutually convex surfaces of mating gear teeth, as provided by the present invention.

U.S. Pat. No. 1,646,374 issued on Oct. 18, 1927 to John T. Wilkin, titled "Gear," describes a gear configuration having a relatively tall and narrow profile. While such gear profiles do not possess particularly high strength per se, Wilkin configures his gear profiles so that a series of several teeth are engaged simultaneously between the driving and driven gears. This results in the bending stresses on each tooth being relatively low for a given torque being applied from the driving to the driven gear. However, the Wilkin gears, due to their relative length and multiple tooth engagement, result in considerable sliding contact between teeth in the approach and departure areas of mesh. Also, while Wilkin configures his gear teeth with relatively wider addendum portions in order to provide the desired multiple tooth engagement, he does not provide any form of relief in these convex areas to preclude high compressive forces between the end of one tooth and the convex addendum area of the adjacent tooth.

U.S. Pat. No. 2,335,504 issued on Nov. 30, 1943 to Antoine Gazda, titled "Gear Teeth," describes the provision of slots extending from the outer end of each tooth, inwardly toward[0a‰9]ts root. Gazda's object is to allow the teeth to flex somewhat more than otherwise, in order to provide some resilience upon engagement and thus provide quieter operation and reduce cracking and breakage at the root due to the relatively brittle structure of a conventional gear tooth. Gazda does not disclose any means for reducing the high compressive forces occurring between convex faces of mating teeth, as provided by the present invention.

U.S. Pat. No. 3,533,300 issued on Oct. 13, 1970 to Robert M. Studer, titled "Helical Gearing," describes a variation in Novikov type gear profiles incorporating circular arcs for the profiles. The Studer gear profile uses a double flank shape, having a convex addendum and concave dedendum to produce a somewhat sinusoidal tooth profile from root to tip. However, Studer widens the concave dedendum portion in order to provide greater bending strength for the resulting relatively tall tooth. This results in a generally horizontal step (i. e., generally parallel to the pitch circle) between the concave and convex portions of each tooth face. The gear profile of the Studer '300 U.S. Patent thus more closely resembles the profile of the Hammar '702 U.S. Patent, than the gear tooth profiles of the present invention. A review of FIG. 2 of the Studer U.S. Patent shows that substantially all of each tooth face contacts the adjacent tooth face as the gears roll through mesh, whereas the present gear profile results in a relief formed generally to each side of the pitch circle, with the relief area remaining out of contact with the adjacent gear tooth face.

U.S. Pat. No. 4,184,380 issued on Jan. 22, 1980 to Evgeny I. Rivin, titled "Gears Having Resilient Coatings," describes an elastomer coating upon at least one face of the teeth of one of a meshing pair of gears. Rivin states that this reduces friction and noise, as the elastomer compensates for the sliding which would otherwise occur between gear teeth. The Rivin coating does not provide a relief in the tooth profile to relieve contact pressure between mating convex areas of the gear teeth.

U.S. Pat. No. 4,238,970 issued on Dec. 16, 1980 to Willis M. Carter, titled "Bevolute Gear System," describes a ring and pinion gear assembly in which the tooth pattern (but not necessarily the profiles of the individual teeth) is an involute curve for both the ring and the pinion. While Carter states that this pattern may be applied to ring and pinion sets using many different types of gear tooth profiles, he does not disclose any relief in the faces of his gear teeth for relieving high contact pressures across those mating areas of the teeth, as provided by the present non-involute gear profile invention.

U.S. Pat. No. 4,367,058 issued on Jan. 4, 1983 to Willis M. Carter, titled "Bevolute Gear System," is a divisional patent of the '970 U.S. Patent discussed immediately above. The same points of distinction between that patent and the present invention, are; seen to apply here as well.

U.S. Pat. No. 4,640,149 issued on Feb. 3, 1987 to Raymond Drago, titled "High Profile Contact Ratio, Non-Involute Gear Tooth Form And Method," describes a gear tooth profile which combines involute and non-involute profiles to provide a relatively high contact ratio for the meshing gears. It is noted that the resulting profile of the Drago gear, is essentially continuously convex, excepting the root area. This results in non-conformal contact across the entire tooth face, with resulting relatively high contact pressures. However, Drago does not provide any means for relieving the profile to relieve such high contact pressures, as provided by the present invention.

U.S. Pat. No. 4,653,340 issued on Mar. 31, 1987 to Joseph LaBate, titled "Beveled Spur Gear," describes spur gear sets having beveled tips, so that when such gears are disengaged and then reengaged, the beveled tips slide circumferentially about one another to permit positive engagement of the teeth, rather than having the top lands of the teeth abut against one another. LaBate does not describe any particular gear tooth profile in his patent, other than describing the beveled tips of the teeth. No means is disclosed for relieving contact pressure in convex to convex gear tooth profiles, as provided by the present invention.

U.S. Pat. No. 4,911,032 issued on Mar. 27, 1990 to Ronald J. Steele et al., titled "One-Way Gear," describes a gear profile in which a portion of one face of every second tooth is partially cut away, with the root retaining the original thickness. This results in a step formed somewhat below the pitch circle of every other tooth, on one side of those teeth. Such a gear can be used to drive another gear by means of the unstepped sides of the teeth, but if rotation is reversed, one of the steps of the stepped teeth engages a corresponding top land of a gear tooth of the driven gear, resulting in gear lockup. The Steele et al. gear profile has very limited application, due to the relatively large backlash from cutting away a portion of some of the teeth, and the relatively low contact ratio provided. Steele et al. do not provide any means of reducing the contact pressure applied between two adjacent convex gear tooth surfaces, as is accomplished by the present invention.

U.S. Pat. No. 5,271,289 issued on Dec. 21, 1993 to Meriwether L. Baxter, Jr., titled "Non-Involute Gear," describes a series of gear tooth profiles providing conjugate operation between gears, i. e., constant rotational velocity being transmitted from the drive gear to the driven gear. Baxter, Jr. accomplishes this by varying the radius of the tooth profile between root and tip or outer land, with the increase and decrease in radius being generally symmetrical about the pitch circle. As the Baxter, Jr. gear tooth profile is a continually convex curve, albeit one of varying radius, it results in relatively high contact pressures along the contact areas of adjacent gear teeth. Baxter, Jr. does not disclose any means of relieving the high contact pressures between gear teeth, as provided by the present invention.

U.S. Pat. No. 6,178,840 issued on Jan. 30, 2001 to John R. Colbourne et al., titled "Gear Form Constructions," describes gear profiles where the teeth of the first gear have a constant (or nearly so) convex curvature, with the teeth of the mating second gear having a mating concave curvature. Colbourne et al. state that their profiles provide conjugate operation without need for helical gears. However, the conformal contact (i. e., congruent surfaces resulting in area contact, rather than a line across the mating teeth) result in relatively high sliding velocities between the mating teeth, where they are not aligned with the pitch circle. While the Colbourne et al. gear tooth profiles result in reduction of high contact pressures due to their conformal shapes, no means is provided for relieving such forces along the center of the teeth.

U.S. Pat. No. 6,205,879 issued on Mar. 27, 2001 to Faydor L. Litvin et al., titled "Helical And Spur Gear Drive With Double Crowned Pinion Tooth Surfaces And Conjugated Gear Tooth Surfaces," describes gear tooth profiles having compound convex curvatures of their contact faces. The stated advantage is that the actual contact areas of mating gear teeth form relatively wide elliptical patterns, due to the compression of the gear material upon contact. The Litvin et al. gear tooth profiles teach away from the profiles of the present invention, as the Litvin et al. profiles are continuously convex in two mutually normal planes over the tooth contact area. In contrast, the gear tooth profiles of the present invention include at least one concave relief formed generally at about the area of the pitch circle of each gear tooth face, thus removing all contact pressure from that area.

British Patent Publication No. 186,436 accepted on Oct. 2, 1922 to Francis J. Bostock et al., titled "Improvements In And Relating To Gear Teeth," describes a gear tooth profile formed by combining aspects of the cycloid and involute curves. Bostock et al. claim various advantages from such a gear tooth profile, including ease of manufacture, low specific sliding, "enveloping" tooth profiles (this appears to refer to conformal contact, where the driving and driven teeth are shaped differently), relatively strong teeth, and low obliquity of the drive angle between teeth. However, the Bostock et al. gear tooth profile is a consistently curved surface, with no additional concave relief formed therein to relieve high contact pressures, as provided by the present invention.

British Patent Publication No. 1,232,019 published on May 19, 1971 to Robert M. Studer, titled "Improvements In Helical Gearing," is the parent application to U.S. Pat. No. 3,533,300 to the same inventor, discussed further above. The '300 U.S. Patent and '019 British Patent Publication both describe a variation in Novikov type gear profiles incorporating circular arcs for the profiles. Studer provides a step in the sides of his gear teeth between the addendum and dedendum, citing improved bending and shear strength provided by the relatively wider bases of the stepped teeth. The same points raised further above in the discussion of the '300 U.S. Patent, are seen to apply here as well.

PCT Patent Publication No. WO 88/03,623 published on May 19, 1988, titled "Gear Drive With Mixed-Type Meshing," describe (according to the drawings and the English abstract) a hybrid gear tooth profile having a convex involute shape at about the location of the pitch circle, with Novikov profiles extending thereabove and therebelow. The result is a somewhat sinusoidal tooth profile, with mating teeth bearing against one another along their mutual convex involute portions during at least part of their mesh. No relief area is provided along this convex portion of the profile to relieve the extremely high contact pressures occurring, as provided by the present gear tooth profile invention.

Section Two of the publication *Manual Of Gear Design*, original copyright 1935 (renewed 1962) by Earle Buckingham, provides a background discussion of various gear configurations and the mathematics and engineering involved in the selection and design of various types and configurations of gear teeth for various purposes. This publication notes the use of the accepted standard ASA-B6b-1933 of the AGMA (American Gear Manufacturers Association) and on p. 45, provides a discussion of proportions for a 14.5 degree composite gear system based upon the above noted ASA-B6b-1933 standard. While the present invention utilizes non-involute gear profiles including an at least partially cycloidal profile over a portion of the tooth face, Buckingham does not suggest any form of relief disposed in the face of the gear teeth in order to avoid high compression stresses, as provided by the present invention.

The book *Analytical Mechanics Of Gears*, copyright 1949 by Earle Buckingham (republished 1988 by Dover Publications Inc., New York), provides considerable information on gear profile theory and practice for virtually any type of gear (spur, helical, worm drive, etc.). Pages 25–29 discuss the cycloid, epicycloid, and hypocycloid shapes which may be used in forming gear tooth profiles, with the first portion of chapter two on pages 58–73 providing a discussion of the theory of the involute curve used in gear tooth profile formation. While other sections of the books deal with various other aspects of gear tooth profile theory, Buckingham does not disclose any provision for a relief formed generally in the central area of the tooth profile for relieving the otherwise high stress which would occur between mating convex surfaces of either involute or non-involute gear teeth.

A technical paper titled "On Design And Performance Of Involute-Cycloid Composite Tooth Profile Gear," by Yoshio Terauchi et al., published as pp. 118–126 in the Bulletin of the JSME (Japanese Society of Mechanical Engineers) No. 199 (January, 1982) discusses the development of an involute-cycloid composite gear tooth profile to avoid the high compression stresses developed in the conventional continuously convex profiles of mating involute gear teeth. The last sentence of the first full paragraph of the second column of the first page (p. 118), notes that gears having cycloid curve tooth profiles are not suitable for transmitting loads, as the radius of curvature of the tooth surface is essentially zero at the pitch point. However, Terauchi et al. do not provide a relief across this area of the gear tooth to relieve the high contact stresses, as provided by the present invention.

A technical paper titled "Influence Of The Path Of Contact Shape On Sliding Conditions Between Tooth Flanks," by Joze Hlebanja, presented at the JSME International Conference On Motion And Powertrains in Hiroshima, Japan, Nov. 23–26, 1991, describes research relating to the relative sliding velocities between different gear tooth profiles, and the effect upon the oil film between the gear teeth. While several different gear tooth profiles are considered, emphasis is placed upon a non-involute shape having a sinusoidal profile. While Hlebanja finds that such a profile provides benefits in maintaining the oil film between gear teeth, he does not disclose any provision for a relief formed in the tooth flanks for relieving high pressures between gear teeth.

Finally, another technical paper by Joze Hlebanja, titled "Main Advantages Of Non-Involute Spur Gears: The Design Of Non-Involute Spur Gears To Improve The Condition Of Contact," copyright 1992 by the American Gear Manufacturers Association, provides a discussion of the use of different gear tooth profiles to affect the line of action (i. e., the movement of the contact position along the gear tooth between the root and tip as the gear teeth rotate through mesh) and how this affects the maintenance of the oil film between gear teeth. This paper is similar to the 1991 JSME paper discussed above, and as in that paper, no disclosure is made of any form of relief along the convex areas of the gear tooth profile to relieve high pressures in those areas.

None of the above inventions and patents, taken either singularly or in combination, is seen to describe the instant invention as claimed. Thus a non-involute gear configuration with conformal contact solving the aforementioned problems are desired.

SUMMARY OF THE INVENTION

The present invention comprises a modification to otherwise conventional gear tooth profiles, serving to eliminate high contact pressure peaks between mating gear teeth during gear operation. While the present modification may be applied to a wide variety of gear tooth profiles, it is particularly well adapted for use with non-involute gear tooth profiles.

In the past, most gear tooth profiles have been patterned from involute curves, as such tooth profiles may be cut relatively simply using a straight sided hob tool. The involute tooth profile family provides additional advantages as well, e. g., less sensitivity to variation in center-to-center distances between gear shafts and conjugate operation, i. e., uniform transmission of rotational velocities between mating gears.

However, with the development of computer numerically controlled (CNC) machining technology, it has become possible to manufacture non-involute gear profiles which provide the same accuracy of contour as that previously attained in the machining of involute profiles. Such non-involute profiles (cycloids, etc.) can provide advantages in efficiency which are lacking in the involute family of profiles, particularly in providing conformal contact, i.e., contact over an area of mating convex—concave gear teeth, rather than only along a line across mating convex tooth areas.

The present invention eliminates relatively high contact pressure spikes between mating convex gear tooth areas, by means of a relief or shallow recess formed at the convex portion of the gear tooth profile, generally in the area of the pitch circle of the gear. This precludes the high contact pressures which would otherwise occur across this area of the gear teeth, thereby greatly reducing stress and strain upon the gear teeth in a given application, as well as reducing localized heating and shear stress upon any lubricants between the gear teeth.

With the avoidance of the high pressure contact spike between gear teeth in their meshing contact, such gears can transmit greater torque than was heretofore possible. Alternatively, the gears may be made smaller to transmit a given torque, thus resulting in smaller and lighter weight transmissions. The present invention will thus be seen to have great value in the automotive and helicopter aviation fields, as well as others, where compact configurations, light weight, and efficiency are highly desired.

Accordingly, it is a principal object of the invention to provide a series of non-involute gear tooth profiles including a relief formed in at least one of each pair of mating gear teeth in a gear system, for relieving high contact pressure spikes between mating gear teeth.

It is another object of the invention to provide such a relief for families of gear tooth profiles providing rolling and sliding interactive motion between mating gear teeth, as well as for families of gear tooth profiles providing pure rolling motion between mating gear teeth.

It is a further object of the invention to provide gear tooth profile relief in combination with conformal contact between mating gear teeth, by means of mating or congruent convex to concave contact between mating gear teeth.

Still another object of the invention is to provide gear tooth profile relief in combination with gear tooth profile embodiments providing conjugate gear operation for uniform transmission of rotary motion.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of gear tooth profiles, shapes, or patterns each including means for greatly reducing or eliminating extremely high contact pressures between mutually convex surfaces of mating gear teeth. This is achieved by forming a relief or depression in the face of at least one of the two mating teeth, thereby precluding contact between the two teeth at that location. While the present invention is directed primarily to use with non-involute (e. g., cycloid) gear tooth profiles, it will be seen that it may be adapted to virtually any form of gear profile in which an area of non-conformal contact (i. e., where the tooth profiles result in a line of contact across the teeth, rather than an area of mutually congruent contact) would otherwise occur.

Figure 1:
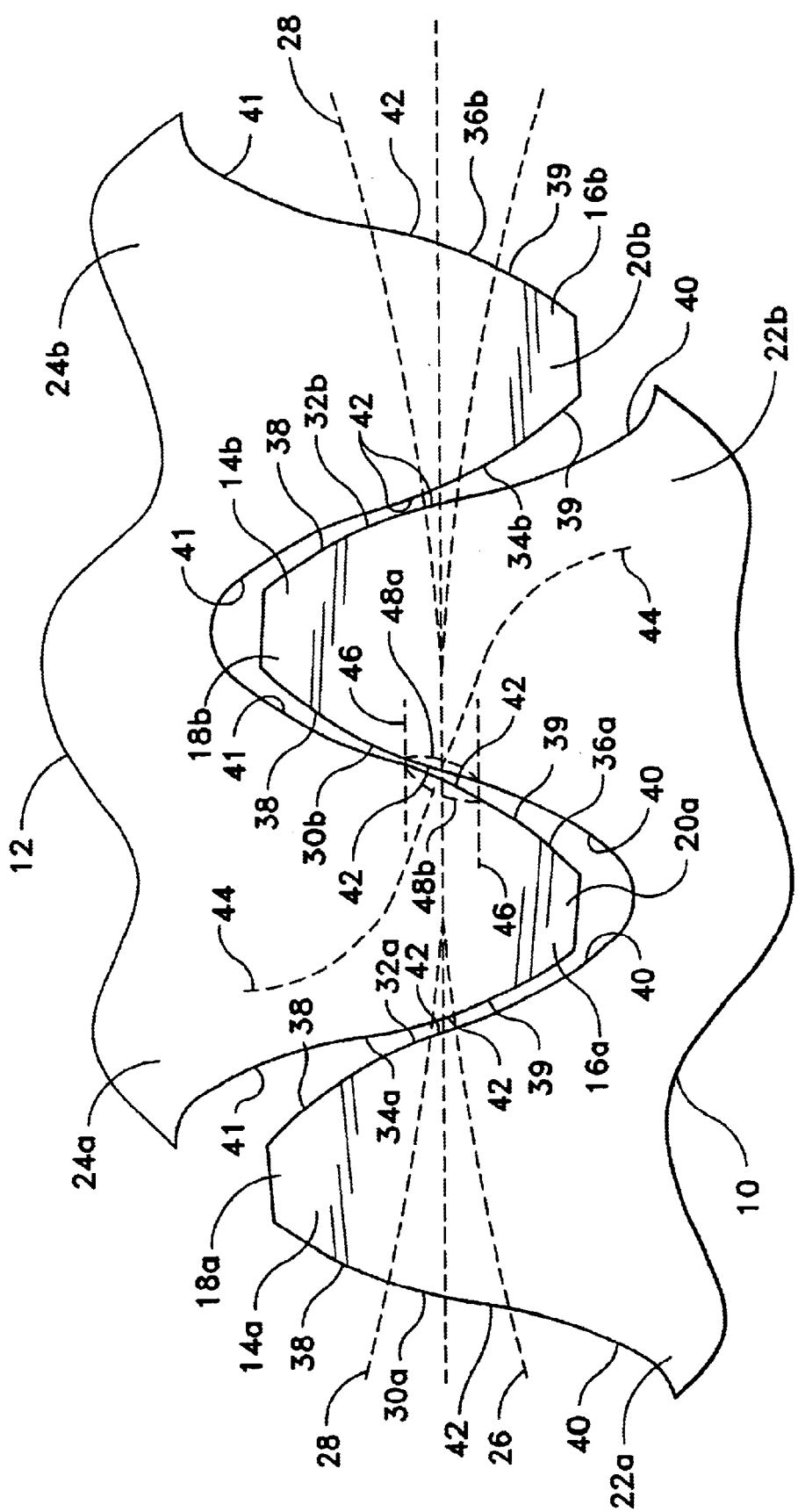
FIG. 1 is a profile view of two intermeshing gears, showing the relief area of the present invention formed in the face of each gear tooth.

FIG. 1 illustrates the principle of the present invention as applied to the gear teeth of two meshed gears 10 and 12. While FIG. 1 illustrates only a portion of each of the two gears 10 and 12, it will be understood that their general shape is conventional, comprising circular structures each having a series of gear teeth disposed circumferentially therearound. The first gear 10 includes circumferential gear teeth 14a, 14b, etc., while the second gear 12 includes circumferential gear teeth 16a, 16b, etc. It will be seen that the gear teeth series 14 and gear teeth series 16 may be identical to one another, and/or one of the two gears 10 or 12 may comprise a straight rack, while still making advantageous use of the present invention.

Each of the gear teeth 14 and 16 includes an outer or addendum portion, respectively 18a, 18b, etc. for the first teeth 14a, 14b, etc., and 20a, 20b, etc. for the second teeth 16a, 16b, etc. Each tooth further includes a dedendum or base area, respectively 22a, 22b, etc. for the first teeth 14a, 14b, etc., and 24a, 24b, etc. for the second teeth 16a, 16b, etc. The addenda and dedenda portions of each of the teeth are defined by the respective pitch circles 26 and 28 of the two gears 10 and 12, as known in the art.

The gear teeth 14a, 14b, etc. of the gear 10 of FIG. 1 each have a first contact face and a symmetrically opposite second contact face, respectively 30a, 30b, etc. and 32a, 32b, etc. It will be understood that the term "contact face" as used in the present application refers to the entire surface area of a gear tooth which may come into contact with a gear tooth on an opposing gear during mesh of the two gears, i.e., the term "contact face" encompasses both the face and the flank of the gear tooth. In a similar manner, the opposite gear teeth 16a, 16b, etc. also have first contact faces 34a, 34b, etc., and opposite second contact faces 36a, 36b, etc. These various gear tooth contact faces 30 through 36 of the two gears 10 and 12 of FIG. 1 are in the form of a non-involute profile or pattern, i. e., having an identical convex cycloidal addendum profile areas 38 and 39 with concave dedendum areas 40 and 41. It will be noted that the generally central area 42 between the addendum 38 and dedendum 40 profile areas transitions from a concave to a convex form or profile across the pitch circles 26 and 28 of the two gears 10 and 12. While the concave and convex tooth profile areas 38 and 40 are conformal, i. e., their curvatures closely fit one another to distribute the compressive forces between the teeth over relatively wide areas, the central areas 42 bear against one another during meshing contact of the opposed gear teeth 14 and 16.

The "contact path" for the meshing non-involute gear teeth of FIG. 1, i. e., the point along the central area of contact, or line of contact, between mating gear teeth as that line or area of contact moves from addendum through dedendum of the gear teeth as: they rotate through mesh, is indicated by the contact path broken line 44 in FIG. 1 for the two teeth 16a and 18b. This contact path 44 forms a sinusoidal curve. The upwardly curved left portion of the contact path line 44 represents the substantially conformal contact between the convex addendum area 38 of the first contact face 30b of the gear tooth 18b, and the congruent concave dedendum area 40 of the mating second contact face 36a of the gear tooth 16a, as the gear teeth roll through mesh with one another. In a similar manner, the downwardly curved right hand portion of the contact path line 44 represents the substantially conformal contact between the concave addendum area 40 of the first contact face 30b of the gear tooth 18b, and the congruent convex dedendum area 38 of the mating second contact face 36a of the gear tooth 16a.

It will be seen that the transition between the two curved ends of the contact path 44 comprises an essentially straight section, which is shown bound by the lines 46 in FIG. 1. These lines 46 represent a zone or area across the mating tooth faces, e.g., the first contact face 30b of the gear tooth 14a and the second contact face 36a of the gear tooth 16a. This "transition zone" bound by the lines 46, is an area of non-conformal tooth contact, where the two teeth mate along a contact line across the span of the teeth, rather than over an area of the congruent faces.

This results in relatively high pressure being developed along a relatively narrow line across the width of each tooth where the convex addendum portion 38 of one tooth bears against the neutral area 42 of the adjacent tooth during the entry and/or departure phases of gear mesh. For all practical purposes, such convex-to-convex or convex-to-neutral profile contact, is unavoidable at some point during the rotation of the gear teeth against one another, with conventional gearing profiles.

The present invention provides a solution for such high pressure contact points, by providing a relief area formed in the central area 42 of the contact face of at least one of the two mating gear teeth. In FIG. 1, two such relief areas 48a and 48b are shown in broken lines, formed respectively in the central area 42 of the first face 30b of the gear tooth 14b, and in the adjacent central area 42 of the second face 36a of the gear tooth 16a. These two relief areas 48a and 48b comprise relatively shallow (i.e., on the order of a very few percent, or less, of the height of the gear teeth) depression(s) formed in the central profile area(s) 42 of the adjacent contact face(s) of at least one of the two mating gear teeth, e. g., teeth 14b and 16a of FIG. 1. While these reliefs 48a and 48b are shown in broken lines in FIG. 1, it will be understood that this is for the purpose of clarity in the drawing, to differentiate the relief areas 48a and 48b from the central profile areas 42 of the two gear teeth 14a and 16b. One, or both, of the relief areas 48a and/or 48b would be removed from the gear teeth 14a and/or 16b, in order to provide the benefits of the present invention.

A gear set incorporating the tooth profile relief areas of the present invention, would provide essentially purely conformal contact between the adjacent addenda and dedenda of mating gear teeth, while obviating high pressure contact along a narrow transverse line along the central profile areas. While forming such a relief in the faces of gear teeth results in a discontinuity along the faces of the teeth, it will be seen that by providing helical gear sets having face contact ratios (i. e., the ratio of the helical advance arc of action and the circular pitch of the gears) at least slightly higher than one, thus insuring that some portion of the addenda and dedenda of mating teeth are always conformably engaged along the entry and exit mesh of the teeth. Alternatively, or in addition, gear sets having teeth incorporating the present central relief areas in the teeth may be formed to have a contact ratio between tooth profiles (i. e., the ratio of the arc of travel during tooth contact and the arc between adjacent teeth on a gear) at least slightly greater than two, to provide the desired conjugate operation and avoid uneven action.

Figure 2:
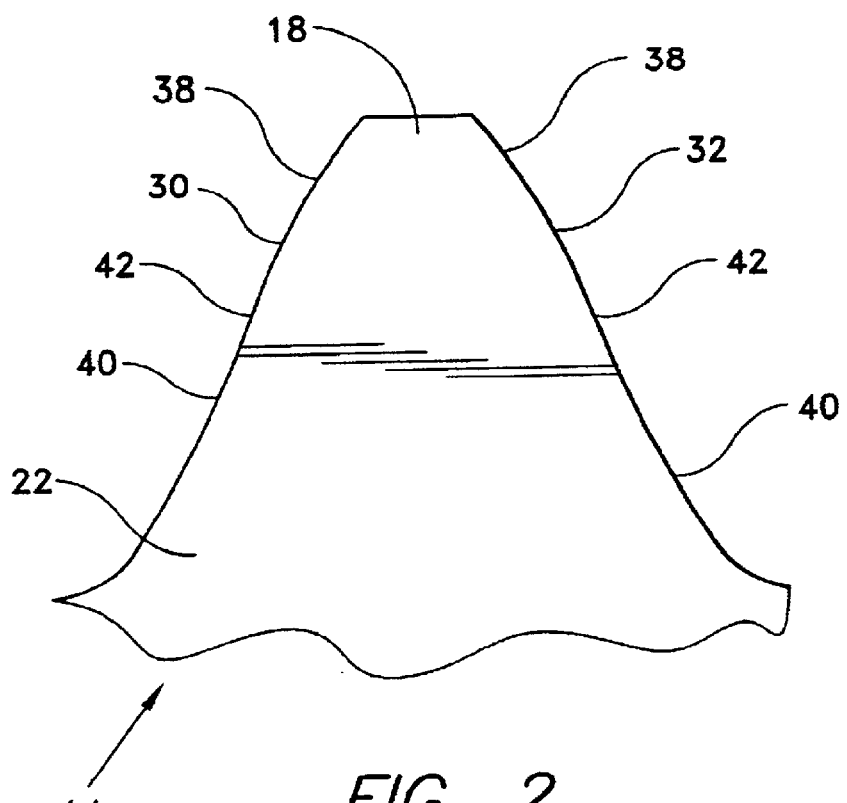
FIG. 2 is a profile view of a conventional non-involute gear tooth, showing its general shape and configuration.
Figure 3:
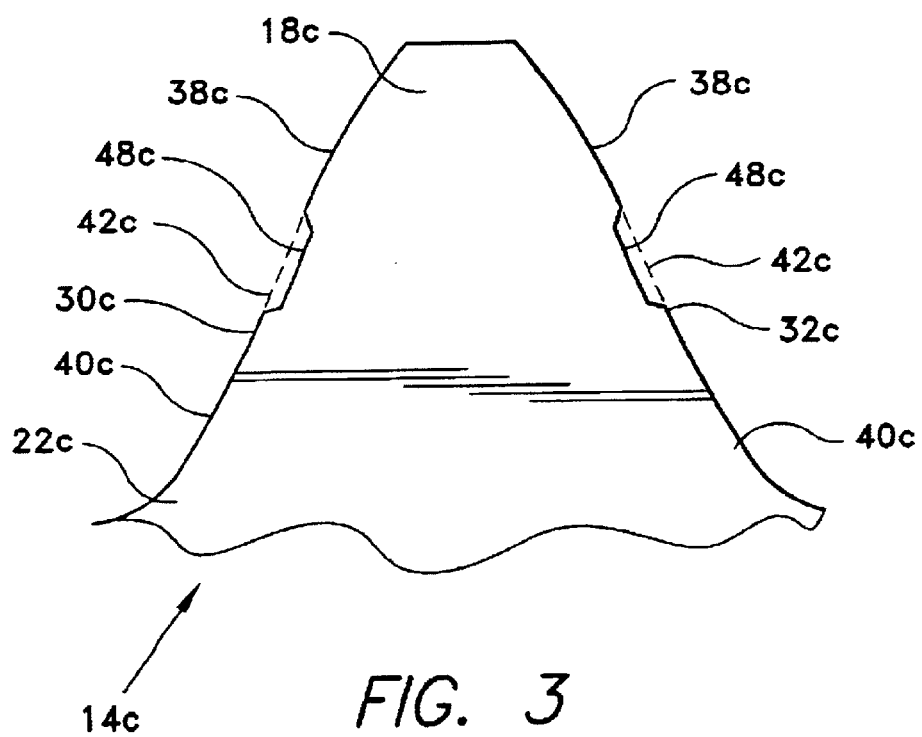
FIG. 3 is a profile view of the non-involute gear tooth of FIG. 2, but modified with relief areas formed in each flank according to the present invention.

FIG. 2 provides an illustration of the profile of an exemplary gear tooth of the gear set of FIG. 1, e. g., a first gear tooth 14, while FIG. 3 provides an illustration of the profile of such a gear tooth modified as tooth 14c with the present profile relief invention. The two gear teeth 14 and 14c are configured essentially identically to the teeth 14a, 14b, 16a, 16b, etc. of FIG. 1, with the exception of the lack of relief areas in the gear tooth 14 of FIG. 2.

The gear tooth 14 of FIG. 2 and the gear tooth 14c of FIG. 31 each include an addendum, respectively 18 and 18c, an opposite dedendum, respectively 22 and 22c, a first contact face, respectively 30 and 30c, and a symmetrically opposite second contact face, respectively 32 and 32c. The two contact faces 30 and 32 of the gear tooth 14 each have a convex addendum profile 38 and a concave dedendum profile 40, with a central area 42 transitioning between the addendum and dedendum profile areas 38 and 40. Similarly, the modified non-involute gear tooth 14c includes addendum profiles 38c, dedendum profiles 40c, and central areas 42c.

It will be noted that the gear tooth 14c of FIG. 3 has been modified with the present invention, by forming a pair of opposed reliefs 48c in the central areas 42c of its two opposed contact faces 30c and 32c. The two reliefs 48c formed in the contact faces 30c and 32c of the tooth 14c each have floors which are generally parallel to the outline of the tooth profile (shown in broken lines in FIG. 3), with a step at each end thereof, as opposed to the arcuate reliefs 48a and 48b of the two gear teeth 14b and 16a of FIG. 1. It will be seen that the specific shape of the gear tooth profile reliefs of the present invention is not critical, so long as it provides sufficient clearance for the convex portion of the profile of the mating tooth. Also, it will be noted that the depth of the two reliefs 48c of the tooth 14c shown in FIG. 2 are somewhat exaggerated for clarity in the drawing, just as the reliefs shown in FIG. 1 have been exaggerated.

Figure 4:
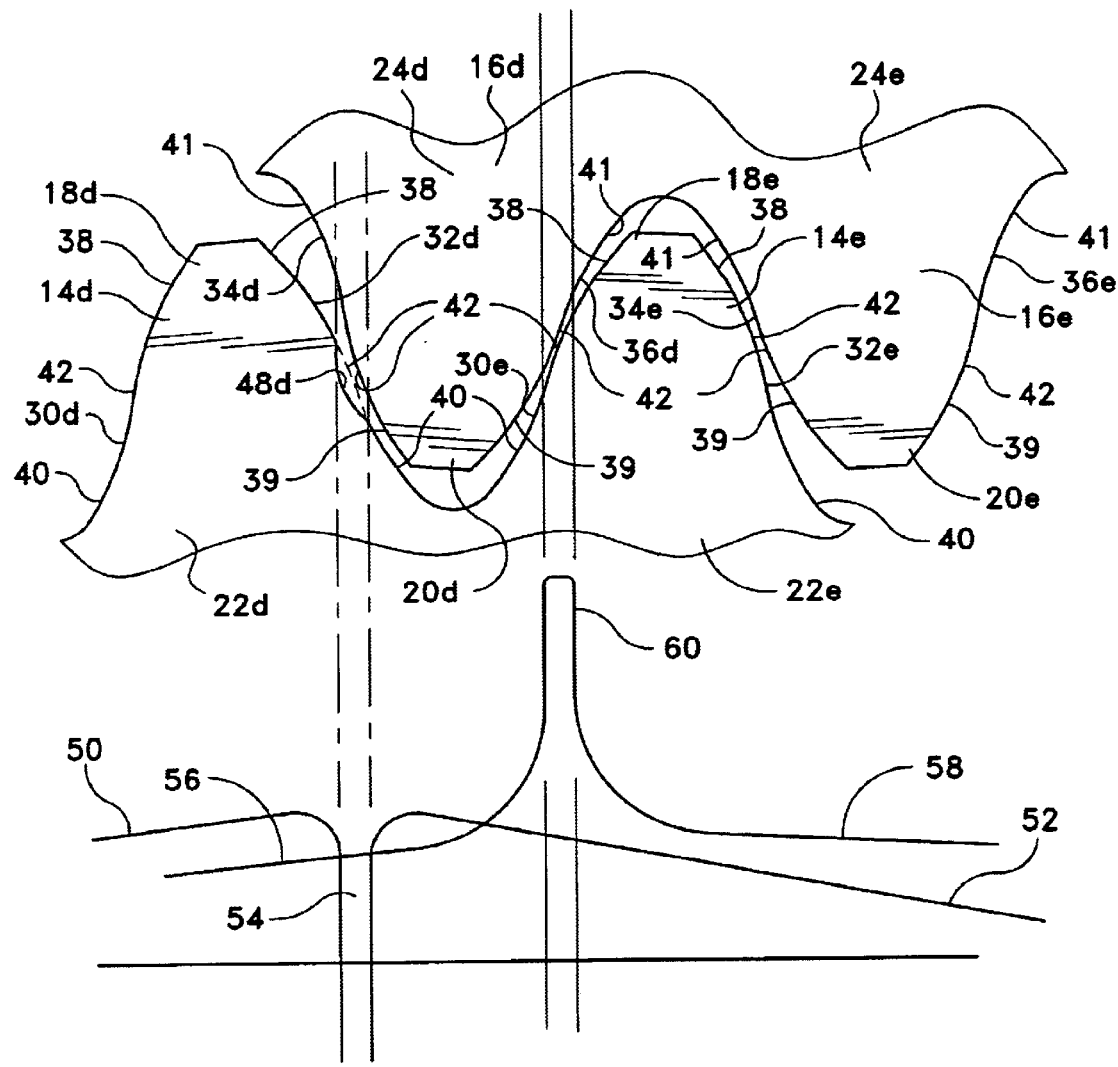
FIG. 4 is a profile view showing adjacent meshing gear teeth, showing the contact pressure differences between a tooth including the relief of the present invention and a conventional gear tooth.

FIG. 4 illustrates the relative pressures which occur between mating gear teeth, with and without the present central relief area. The gear teeth of FIG. 4 are designated as first teeth 14d and 14e, with opposite second teeth 16d and 16e meshed therewith. The teeth 14d through 16e are configured similarly to the teeth 14a through 16b illustrated in FIG. 1, with respective addenda 18d through 20e and dedenda 22d through 24e. Each tooth 14d through 16e further includes a first contact face, respectively 30d and 30e for the teeth 14d and 14e and 34d and 34e for the teeth 16d and 16e. Opposite second contact faces 32d and 32e are disposed upon the first teeth 14d and 14e, with second contact faces 36d and 36e disposed upon the second teeth 16d and 16e. The first and second contact faces 30d, 32d and 30e, 32e of the gear teeth 14d, 14e, as well as the first and second contact faces 34d, 36d and 34e, 36e of the gear teeth 16d, 16e, each also have a convex addendum profiles 38 and 39 and concave dedendum profiles 40 and 41, with a central area 42 transitioning between the addendum and dedendum profile areas 38 and 40, as in the gear teeth 14a through 16b of FIG. 1.

The second contact face 32d of the first tooth 14d includes a relief 48d formed along the central area 42 thereof. This relief 48d is directly opposite the flat, or slightly convex, central area 42 of the first face 34d of the mating second tooth 16d, and serves to preclude contact between the otherwise mating flat or convex surfaces of the two central areas 42 of the second and first contact faces 32d and 34d of the first and second gear teeth 14d and 16d.

The lower portion of FIG. 4 illustrates a pair of graphs which display the relative contact pressures between the two gear teeth 14d and 16d, with the relief area 48d formed in the second contact face 32d of the first tooth 14d, and the relative contact pressures between the contact faces 36d and 30e of the two conventional gear teeth 16d and 14e. The left side 50 of the first graph will be seen to ramp up slowly, or perhaps remain at a constant pressure, depending upon the specific profiles of the two mating teeth 14d and 16d. The opposite right side 52 is substantially symmetrical with the left side 50, due to the identically shaped opposing gear teeth 14d and 16d producing essentially identical pressures at symmetrically opposite points of rotation. (The slopes of the graph sides 50 and 52 may be asymmetrical, where differently profiled first and second gear teeth are used. Rotation is not indicated in FIG. 4, due to the symmetry of the gears and resulting symmetry of the pressure distribution produced.)

It will be noted that the contact pressures drop rapidly to zero at the center area 54 of the first graph, due to the relief area 48d precluding contact between the two central areas 42 of the respective gear tooth faces 32d and 34d. Thus, compressive forces are spread only over the conformal or congruent tooth areas, rather than being distributed over those areas and also producing a pressure spike due to mutually convex, or flat-to-convex, contact between gear teeth.

The second (right side) graph of FIG. 4 illustrates the pressure distribution between conventional gear teeth. In the second graph, the pressure ramps up smoothly on the left side 56 due to the conformal or congruent contact between the mating contact face portions 38 and 40 as the gear teeth 14e and 16d rotate through mesh, and decreases symmetrically to the right side 58 of the graph. However, as the mating contact faces 30e and 36d of the two teeth 14e and 16d rotate through contact through their mutual central areas 42, the relatively narrow lateral line of contact across the widths of the two teeth 14e and 16d due to the non-congruent shapes of the mating central areas 24, produces a significantly higher pressure spike 60.

The total pressures between meshing gear teeth must be distributed completely across the contact areas of the teeth according to the torque being transmitted. This will result in slightly higher conformal contact pressures for gear teeth provided with the relief areas of the present invention. However, such slightly higher pressures are distributed over a much wider angular range of rotation, thus resulting in relatively little pressure increase at any given point, and completely eliminating the central pressure spike produced during mesh of conventional non-involute gears. The benefits provided by the present invention in terms of being able to produce smaller gears for the transmission of a given torque, and/or reduce manufacturing expenses (case hardening, etc.), result in smaller, lighter, and/or less expensive gears and transmissions for a given power requirement.

Figure 5:
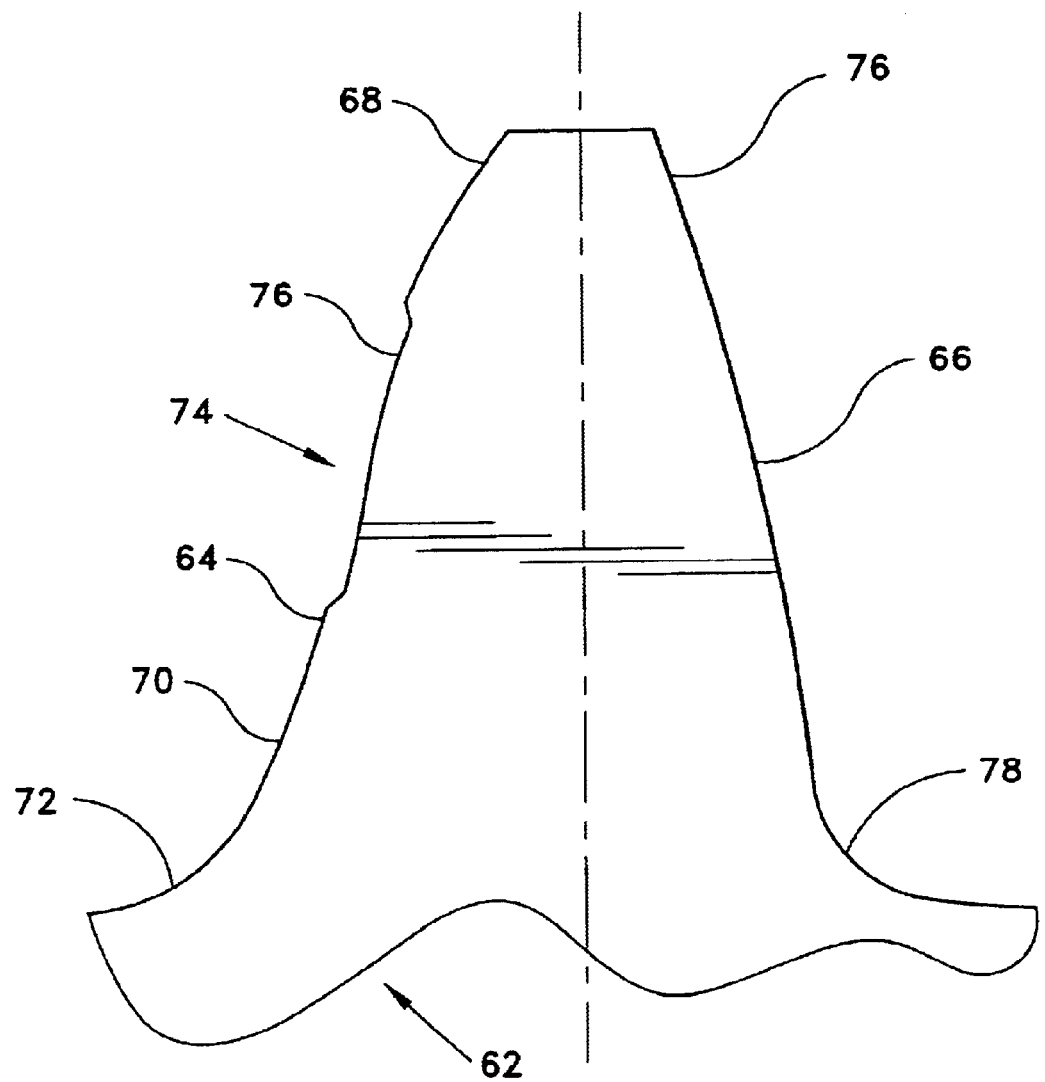
FIG. 5 is a profile view of an asymmetrical gear tooth incorporating the present relief in one face thereof.

FIG. 5 illustrates an alternative embodiment, with the relief applied to an asymmetrically shaped gear tooth. The gear tooth 62 of FIG. 5 includes a first contact face 64 having a curvature other than that formed by an involute (e. g., cycloid, etc.), while the opposite second contact face 66 has a form derived from an involute curve. It will be seen that the non-involute surface 64 of the first side, results in an addendum 68 having a convex curvature and a dedendum 70 having a slightly concave curvature as it flows into the root area 72. This provides the desired conformal contact, distributing pressures between mating gear teeth over relatively large face areas. The exception to this scenario is the central area 74 of the non-involute curvature, as noted in other examples above. Accordingly, the central area of the non-involute tooth face 64 is provided with a relief 76, in order to avoid mating tooth contact along a relatively narrow line across the mutually convex areas of two mating non-involute teeth, as indicated by the pressure spike 60 in the right hand graph of FIG. 4.

The opposite right side or second face 66 of the tooth 62 of FIG. 5 has an involute curvature, as noted further above. This results in the second face 66 having a continuous convex curvature from the tip of the addendum 76 to the root 78. It will be seen that this results in a relatively narrow line of contact, and resulting high pressure, between similarly configured mating teeth. The relief of the present invention is not applicable to such continuous convex curved tooth profiles, as it is not possible to relieve the entire area of convex curvature.

While gear teeth are normally manufactured to have laterally symmetrical shapes, it will be seen that this is not required, and that gear teeth may be manufactured to have various asymmetrical configurations, such as the non-involute/involute faces of the gear tooth 62 of FIG. 5. In fact, there may be certain advantages to such asymmetrically shaped gear teeth where the gears are non-reversing, i. e., the pressures between mating teeth only occur on one face at all times. In such a case, the unloaded face, e. g. the second face 66 of the gear tooth 62, may be machined with an involute curvature, if so desired. This can provide certain advantages, in that the addendum of the resulting tooth profile may be extended without becoming too narrow, thus providing a taller tooth with greater contact area than a purley non-involute shape.

Figure 6:
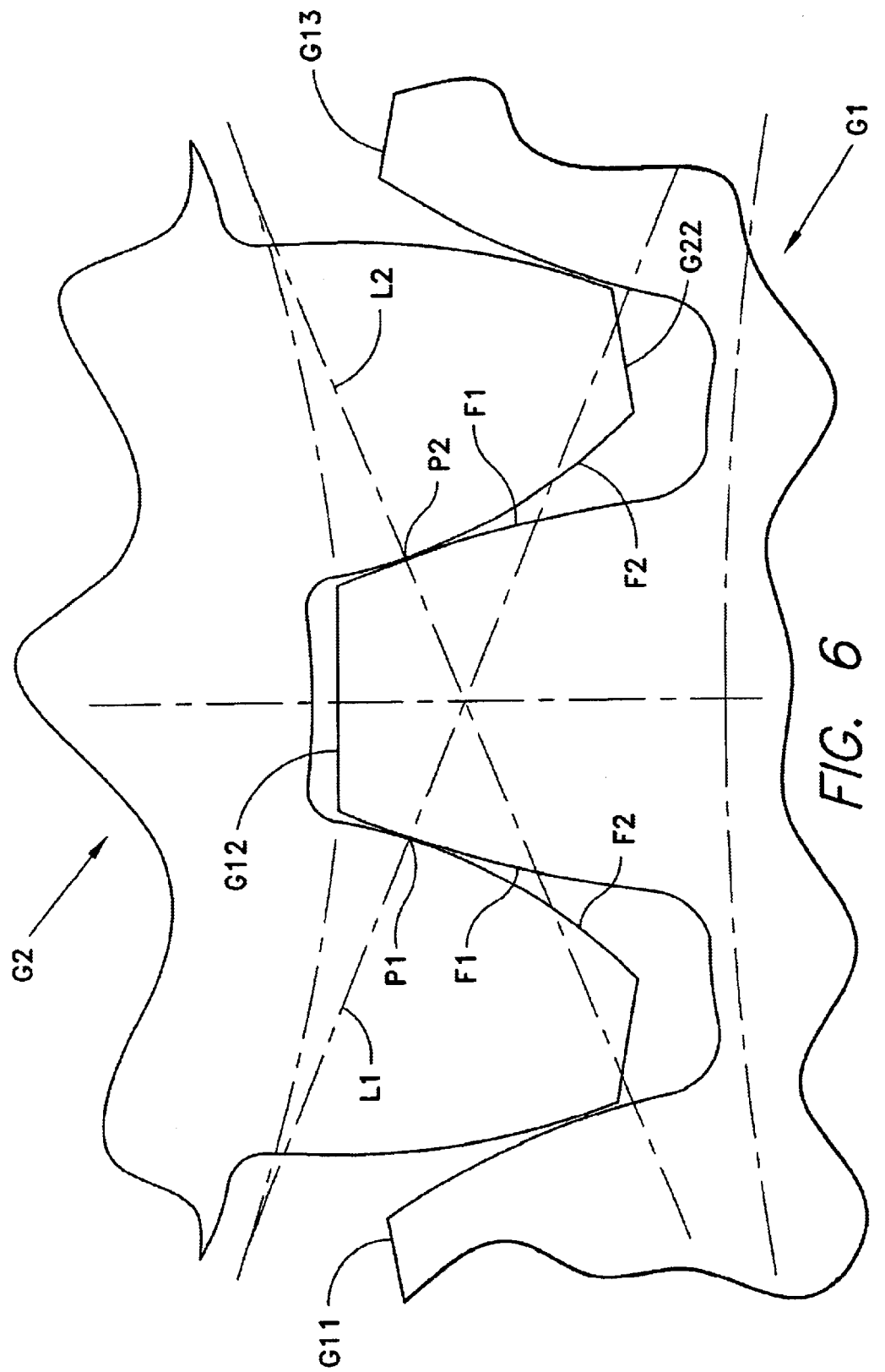
FIG. 6 is a profile view of the mesh of two prior art gears having teeth with involute profiles.

FIG. 6 of the drawings illustrates the geometry of meshing conventional gear teeth having involute contact faces or profiles. In FIG. 6, a set of gears G1 and G2, respectively having gear teeth G11, G12, G13 and G21, G22 are meshingly engaged with one another. Each of the gear teeth G11, G12, G13, G21, and G22 are formed or profiled to have contact faces F1 for the teeth G11, G12, and G13, and F2 for the teeth G21 and G22 in the shape or form of an involute curve. This results in continuously convex curved faces F1 and F2 for each of the gear teeth and point contact between mating gear teeth at points P1 and P2 along their respective lines of action and paths of contact L1 and L2, as viewed in a side elevation view such as FIG. 6; the teeth actually contact one another along a narrow line extending across the width of the teeth.

One of the main advantages of the involute tooth profile is that assuming that the drive gear is rotating at a constant rotational velocity, rotational motion imparted to the driven gear will also be at a constant rotational velocity as well. This is evidenced by the straight lines of action or paths of contact L1 and L2 illustrated in FIG. 6, which indicate that the contact point between gear teeth will travel along the faces of the two mating teeth at a constant rate from addendum to dedendum (or visa-versa, depending upon which gear tooth is being referenced and the direction of rotation of the gears), when the two gears are rotating at constant rotational velocities.

However, involute gear tooth profiles have disadvantages as well. Such involute tooth profiles result in non-conformal contact between mating teeth, i. e., the contact is not spread over a relatively large area between adjacent teeth. The continuous convex curvature of the involute tooth profiles results in point contact between gears at all locations of mesh, when considered as an infinitely thin gear wheel viewed in profile. This results in a theoretically infinite compressive stress between mating teeth, even when the contact is spread along a theoretically infinitely thin line extending across the width of the teeth. While the compressive stresses between teeth are of course finite in practice, they are nonetheless considerably higher than the compressive stresses developed between conformably configured teeth, i. e., the non-involute gear teeth having the generally centrally disposed relief areas of the present invention.

Accordingly, the present invention enables gears to be manufactured with a non-involute profile to provide essentially continuous conformal contact along substantially the entire mating tooth surfaces of adjacent gear teeth. The relatively small area of mutually convex curvature found between adjacent teeth is provided with a relief formed in accordance with the present invention, in order to avoid point (or actually, a thin line) contact between the mutually convex areas of the mating gear teeth.

It will be seen that the present gear tooth invention is adaptable to virtually any otherwise conventional type of gear, e.g., spur gears, bevel gears, and face (also known as crown) gears. The only limitation upon the present invention is that it requires helically cut gear teeth in order to provide smooth transmission of power from the drive gear to the driven gear. This is due to the discontinuity in the face of the gear teeth, due to the relief area formed in the face of at least one of the two meshing teeth in a gear set. However, the use of helically cut gears is conventional in many operations, and is used for the purpose of reducing noise, smoothing power transfer between gears, and distributing the tooth load over a larger area or number of teeth. The present invention, when applied to such helically cut gears, results in further advantages, with the relatively larger contact area between teeth due to the conformal shape allowing a gear set developed for transmitting a predetermined torque to be formed using lighter and smaller gear teeth and gear sets than is the case with gear teeth not provided with the present reliefs.

The present non-involute gear configuration with its relief areas providing substantially conformal contact, will thus prove to be of significant benefit in many operating environments where weight, size, and operating efficiency of gear sets are critical. One such area is in helicopter transmissions, as it is critical that all helicopter components be constructed as lightly as possible in order to maximize the useful load of the machine. Automobile transmissions will also benefit from the use of the present gear configuration, as reduction in weight is a critical factor in increasing fuel mileage in order to continue to meet and/or exceed the required corporate average fuel economy standards.

Gears are primarily dimensioned according to the anticipated compressive forces between meshing teeth, as bending forces can be accommodated by adjusting the size or pitch of the teeth. By providing substantially continuous conformal contact (excepting the relatively small relief area of each tooth), compressive stresses are reduced substantially. The present invention enables on the order of three to five times as much load to be transmitted across meshing gear teeth for a given gear diameter and pitch, in comparison to gear sets of the prior art. Alternatively, the present invention enables gear sets to be formed less expensively to carry a given torque load, allowing relatively costly case hardening and other finishing steps to be eliminated from their manufacture. In some instances, this can result in cost savings of forty to fifty percent of the cost of manufacturing the gears.

The present invention thus enables gear sets to be made smaller, lighter, and more compactly than gear sets of the prior art for a given torque transmission rating, thus providing significant gains in efficiency for vehicles, devices, and machines using the present relieved gear configuration.

It is to be understood that the present invention is not limited to the embodiments described above, but encompasses any and all embodiments within the scope of the following claims.

I claim:

1. A gear tooth, comprising:
a gear tooth having a first contact face and a second contact face disposed generally opposite said first contact face, the gear tooth further having a convex addendum portion and concave dedendum portion, defined by a pitch circle therebetween, the convex addendum portion and concave dedendum portion defining a profile along each contact face, the profiles each being a continuous curve, each of the contact faces of said gear tooth further having a transition spanning the pitch circle; and
wherein at least one of the contact faces further includes a relief disposed across the transition spanning the pitch circle, the relief having a floor with ends and a step at each end of the floor to define a groove, and the relief being located within the profile of the associated contact face.

2. The gear tooth according to claim 1, wherein said gear tooth has a cycloidal profile.

3. The gear tooth according to claim 1, wherein the first contact face and the second contact face of said gear tooth have symmetrical profiles.

4. The gear tooth according to claim 1, wherein each of the contact faces is configured for providing conformal contact with identically configured gear tooth profiles, to each side of said relief.

5. The gear tooth according to claim 1, wherein said gear tooth is configured for use with gears selected from the group consisting of spur, helical, face, and bevel gears.

6. A gear structure, comprising:
a gear having a plurality of identically configured gear teeth;
each of said gear teeth further including a first contact face and a second contact face disposed generally opposite said first contact face, said gear teeth further having a convex addendum portion and a concave dedendum portion, defined by a pitch circle therebetween, the convex addendum portion and concave dedendum portion defining a profile along each contact face, the profiles each being a continuous curve, each of the contact faces of each of said gear teeth further having a transition spanning the pitch circle; and wherein at least one of the contact faces of each of said gear teeth further includes a relief disposed across the transition spanning the pitch circle, the relief having a floor with ends and a step at each end of the floor to define a groove, and the relief being located within the profile of the associated contact face.

7. The gear structure according to claim 6, wherein at least one of the contact faces of each of said gear teeth has a cycloidal profile.

8. The gear structure according to claim 6, wherein the first contact face and the second contact face of each of said gear teeth have symmetrical profiles.

9. The gear structure according to claim 6, wherein each the contact face of each of said gear teeth is configured for providing conformal contact with identically configured gear tooth profiles, to each side of said relief.

10. The gear structure according to claim 6, wherein said gear is selected from the group consisting of spur, helical, face, and bevel gears.

11. A gear train, comprising:

at least a first gear and a second gear enmeshed with said first gear;

each said gear having a plurality of identically configured gear teeth, each of said gear teeth further including a first contact face and a second contact face disposed generally opposite said first contact face, said gear teeth further having a convex addendum portion and a concave dedendum portion, defined by a pitch circle therebetween, the convex addendum portion and concave dedendum portion defining a profile along each contact face, the profiles each being a continuous curve, each of the contact faces of said gear teeth further having a transition spanning said pitch circle; and wherein at least one of the contact faces of each of said gear teeth further includes a relief disposed across the transition spanning the pitch circle, the relief having a floor with ends and a step at each end of the floor to define a groove, and the relief being located within the profile of the associated contact face.

12. The gear train according to claim 11, wherein at least one of the contact faces of each of said gear teeth has a cycloidal profile.

13. The gear train according to claim 11, wherein the first contact face and the second contact face of each of said gear teeth have symmetrical profiles.

14. The gear train according to claim 11, wherein each of the contact faces of each of said gear teeth is configured for providing conformal contact with identically configured gear tooth profiles, to each side of said relief.

15. The gear train according to claim 11, wherein each said gear is selected from the group consisting of spur, helical, face, and bevel gears.

* * * * *